United States Patent Office 2,755,715
Patented July 24, 1956

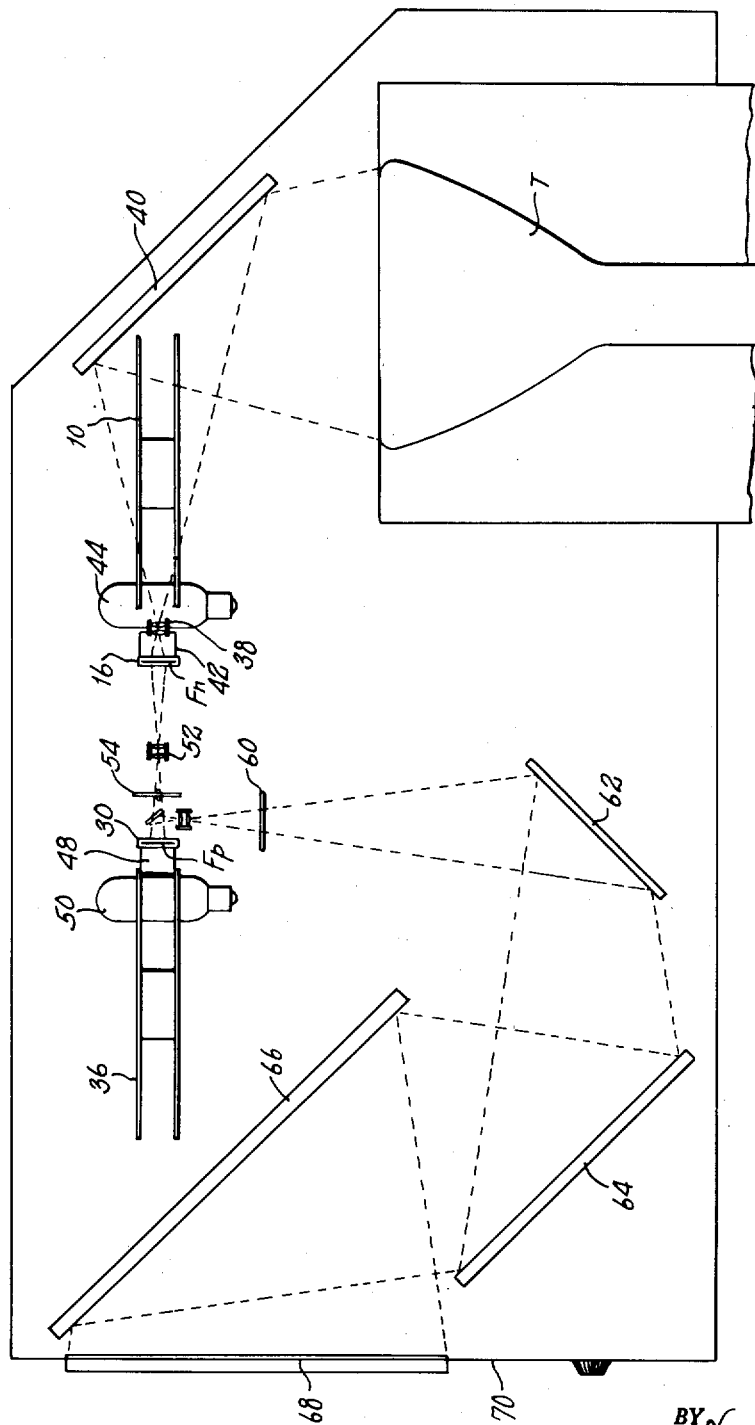

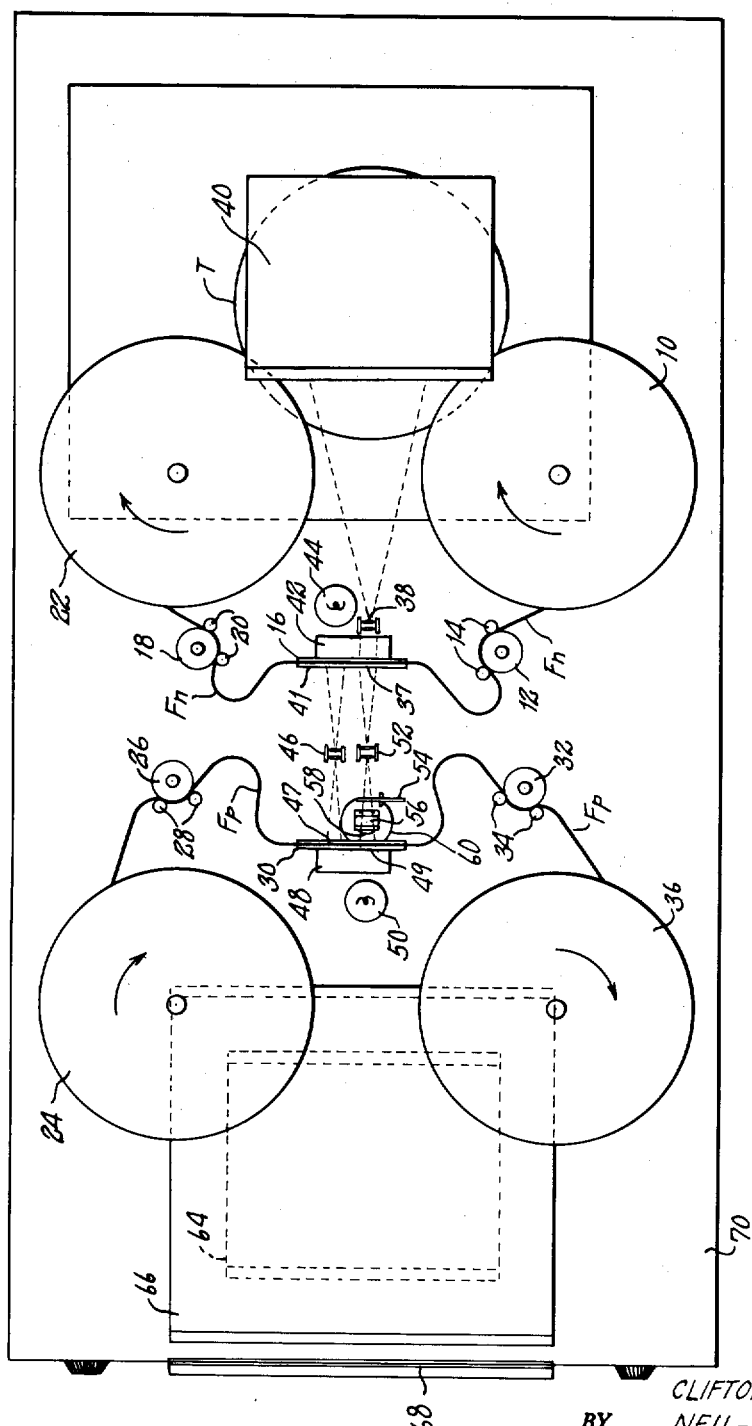

2,755,715
RAPID PROCESSING OF POSITIVE PHOTOGRAPHIC IMAGES

Clifton M. Tuttle and Neil R. Tuttle, Huntington, N. Y., assignors to Kenyon Instrument Company, Inc., Huntington, N. Y.

Application January 7, 1953, Serial No. 329,992

10 Claims. (Cl. 95—14)

In our copending application Serial No. 254,218, filed November 1, 1951, now abandoned, of which the present application is a continuation-in-part, we disclosed a method and apparatus whereby the time interval between the exposure of the negative film to the radar screen and the production of a positive record was materially reduced as compared with systems used previously.

The present invention, which is an improvement over that disclosed in the above-mentioned copending application, has for its object a method and apparatus which makes it possible to determine relative movement of elements of an object such as the traces on a radar screen, which provides a permanent record of the relative movement, which aids in the distinguishing of signals having a logical distribution pattern from illogical heterogeneous interference, and which advances the art generally.

According to the invention, two strips of film, one negative and the other positive, are conjointly moved along two pathways. The movement of the film strips is intermittent so as sequentially to bring the successive frames of the negative film strip to rest in an exposure station wherein the frames are exposed photographically to an object, such as the trace upon a radar cathode ray tube. After exposure of each frame, the latent image thereon is developed, preferably at a developing station beyond the exposure station. Then, preferably while the frame is still at the developing station, and without fixing or drying, the developed image is projected upon a frame of the positive film strip which, being moved in timed relation to the negative film strip, is also at rest. The exposed positive film frames are successively developed and then, preferably at a subsequent station, subjected to a projecting operation wherein a light source directs light rays through each positive frame to impinge upon the negative film strip before it reaches its developing station, preferably upon the negative film frame which is then located in the exposure station. In this manner the intensity of the relatively stationary elements of the photographed object will be reinforced and intensified, whereas the relatively moving elements will leave a readily distinguished track.

In a preferred practice of the invention, the successive images appearing at the screen of the cathode ray tube of a radar receiver are focussed upon an intermittently moving negative film band at a first or negative exposure station. Upon exposure, the latent negative image is rapidly indexed to a negative developing station where the image is developed and then projection printed upon an intermittently moving positive film band at a positive exposure station. Here the film is processed in a manner analogous to the negative processing (except that in some applications it will be necessary to fix, wash and dry this film). The processed positive image is then rapidly advanced to a positive projection station where a source of light projects the positive image back upon the new negative frame at the negative exposure station, where it is now being exposed to a new cathode ray tube image. Among other advantages obtained by this invention, the resulting track and/or reinforcement of targets makes it possible to distinguish noise from real targets.

These and other objects and aspects will be apparent from the following description of a preferred embodiment of the invention which refers to drawings wherein:

Fig. 1 is a schematic elevation view; and

Fig. 2 is a schematic plan view.

The embodiment of our invention illustrated in Figs. 1 and 2 is particularly adapted for photographically recording the trace upon the screen of a cathode ray tube T. To this end a strip of negative film $F_n$ from a supply reel 10 passes between the sprockets 12 and 14, thence along a planar pathway determined by a guide piece 16, thence between the sprockets 18 and 20, and thence to a take-up reel 22. In a similar manner, but in a relatively opposite direction, a positive film strip $F_p$ from a supply reel 24 passes between sprockets 26 and 28, thence through a guide piece 30, which is in spaced parallel relationship to the negative film guide 16, thence between the sprockets 32 and 34 to the takeup reel 36. The reels 22 and 36 and the sprockets 12, 18, 26 and 32 are conjointly operated by a drive (not shown) of the conventional type including a Geneva movement whereby an intermittent motion is imparted to the reels and sprocket in the well known manner.

Located adjacent the negative guide piece 16 is an exposure station 37 which includes a lens system 38 whereby the traces upon the screen of the cathode ray tube T reflected by an inclined mirror 40 are focused upon the emulsion of the negative film frame positioned in the exposure station. The negative film strip $F_n$ is moved with an intermittent motion by the feeding means described above to a developing station 41 which is preferably combined with the exposure station in a processing head 42 generally similar to that shown in the copending patent application Serial No. 114,701, filed jointly September 9, 1949, by Clifton M. Tuttle and Fordyce M. Brown and entitled "Method and Apparatus for Processing Photographic Film," now Patent No. 2,665,619, of January 12, 1954. As is described in detail in the latter copending application, passages are provided in the processing head whereby heated processing fluids can be very rapidly introduced and withdrawn from the developing station. Although, as described in the copending application, it is possible by use of the above-mentioned head 42 completely to process and dry a negative frame in several seconds, a further saving in time is realized by using the negative frame immediately after development, dispensing with the fixing and washing operations and thereby obtaining in less than one second an image which can be printed.

In either case, at the completion of the selected processing, the negative film strip $F_n$ at station 41 is subjected to a projecting operation by means of a printing lamp 44, which, if desired, may be automatically flashed when a valve (not shown) cuts off the supply of developer fluid to the film frame at station 41. The lamp 44 and a lens 46 project the developed image of the negative film frame upon the unexposed positive frame of the film $F_p$ located in the exposure station 47 of a second processing head 48 that is similar to the head 42 for developing the negative film $F_n$ mentioned heretofore. As the positive film strip $F_p$ is moved in timed relation to the negative film strip $F_n$, it will be evident that there is always an unexposed positive frame in the printing station 47 of the head 48 to receive the image from the developed negative frame in the station 41 of head 42 each time the printing lamp 44 is flashed. After each positive frame is printed with the image from a correlated negative frame, and while it is still at the positive exposure station 47, it is developed by flowing a developer fluid over its emulsion side, as in the case of the negative film developed at station 41. Then the developed positive film frame is moved to a projection station 49, which is included with station 47 in the common head 48.

The projecting station 49 includes a lamp 50 whose rays pass through the positive film frame disposed in the station 49 so that the image thereupon can be projected by a lens 52 upon the undeveloped negative film frame in the exposure station 37 of the processing head 42. A rotating shutter 54, which is synchronized with the film feeding means, is interposed between the lens 52 and the processing head 48 to cut off the light rays during the movement of the film strips Fp and Fn. The light rays also pass through a beam splitting device, such as the semi-silvered mirror 56, which diverts some of the rays through an optical viewing system including a projecting lens 58, a masking aperture 60 and three inclined mirrors 62, 64 and 66. This optical system directs the diverted rays from the positive frame in the projecting station 49 upon a ground glass viewing screen 68 located in one end of the light-proof housing 70, which encloses the apparatus to prevent light from fogging the film strips.

After a series of successive negative and positive frames have been made, the relatively stationary elements upon the screen of the cathode ray tube T or other object will be reinforced by the projecting or feeding back of information from the positive frames upon subsequent negative frames, so that the image of such stationary elements will become denser and more clearly defined on each succeeding frame. In the case of moving elements or traces upon the cathode ray T, the movement causes a displacement between the image resulting from light rays coming directly from the tube T and the image resulting from the light rays from the positive frame at station 49. If the element movement is rapid enough, two separate images result on the negative frame; otherwise, the images are overlapping. It will be evident that after a series of frames has been exposed, there will be accumulated upon the positive film strip a series of pictures, all except the last of which represent the history of the movements upon the cathode ray screen. The last frame represents the condition which existed approximately one second before the end of the taking of the series of frames.

The viewing screen 68 not only permits the observation of the movement of the elements upon the cathode ray tube T as the frames are being exposed, but provides a convenient means for showing the developed positive film strip Fp as a motion picture. By increasing the velocity of the drive for the reels 24 and 36, the positive film strip Fp can be moved by the projection station in the processing head 48 so that the projected image appears on the screen 68 as a time-accelerated motion picture. In this manner the displacement of the moving elements of the image are clearly discernible upon the screen 68 by an observer. Interpretation of the image pattern is further aided by the repetition of the movement of the image by the reversing of the drive to show the movement as many times as may be necessary.

A further advantage obtained is the suppression of "noise" due to either internal or external interference. Such noise occurs in a heterogeneous miscellaneous pattern which, being non-repetitive, is suppressed while the target image moves in a logical manner to form a pattern that is readily distinguishable.

It will be understood that the station 41 includes a condenser lens (not shown) for receiving the light from lamp 44. This station is made of transparent material providing a path for passage of the developer fluid across the film and at the same time permitting light to pass through station 41 to the positive film at station 47. Such an arrangement is disclosed in our copending application Serial No. 254,218, filed November 1, 1951, which also discloses details which may be used for the positive film station 47. The negative exposure station 37 is apertured to transmit to the film therein the image from the tube T at one side and the image from the positive film at station 49 at the other side.

In operation, the negative film Fn and positive film Fp are held stationary while the negative frame at station 37 is exposed to the tube T on one side and the positive frame at station 49 on the other side. Then shutter 54 closes and film Fn is indexed to move the previously exposed frame to the developing station 41 and move a new frame to station 37. After development and projection of the image at station 41, and development of the positive image at station 47, the positive film Fp is indexed to move its previously exposed frame to projection station 49, whereupon the shutter 54 projects the positive image upon the new negative frame at station 37, which is also exposed to a new image from tube T. The cycle is then repeated.

We claim:

1. The method of photographically recording data, comprising the steps of exposing successive frames of a strip of negative film to form thereon latent images of an object, flowing a developer solution over the emulsion side of each frame subsequent to the exposure thereof to develop the latent image thereon, projecting light through the successive frames of developed negative film and upon the correlated frames of a strip of positive film, to form successive latent images upon successive positive film frames, flowing a developer solution over each positive film frame to develop the image thereon, and projecting light successively through each of the developed positive film frames and upon a negative film frame following that through which the light was projected upon the positive film frame undergoing said last projection, said last projection upon each negative frame being made before development of said last frame, and the image projected on said last negative frame by said last projection being registered with the image of the new record resulting from said last exposing of said last negative frame, except for the part of the record made by a moving element, whereby the record upon succeeding frames indicates the relative movement of elements of the object.

2. The method of photographically recording data, comprising the steps of exposing successive frames of a strip of negative film to form thereon a latent image of an object, flowing a developer solution over the emulsion side of each frame subsequent to the exposure thereof to develop the latent image thereon while the exposed frames are unfixed, projecting light through successive frames to print the developed image upon the correlated frames of a strip of positive film, while each negative film frame is in the position wherein it was developed, flowing developer solution over each positive film frame to develop the image thereon, and successively projecting light through each of the developed positive film frames to impinge upon one of said negative film frames before it is developed, the image projected on said last negative frame by said last projection being registered with the image of the new record resulting from said exposing of said last negative frame, except for the part of the record made by a moving element, whereby the record upon succeeding frames indicates the relative movement of elements of the object.

3. The method of photographically recording data, comprising the steps of moving a strip of negative film along a predetermined pathway, exposing successive frames of said film to form thereon a latent image of an object as each frame reaches a predetermined position along said pathway, flowing a developer solution over the emulsion side of each frame to develop the latent image thereon, moving a strip of positive film in timed relation to the movement of the negative film in a pathway adjacent the pathway thereof, projecting light through the successive frames of developed negative film to print the developed image upon correlated positive film frames, flowing a developer solution over each positive film frame to develop the image thereon, and projecting light successively through each of the developed positive film frames to impinge upon one of said negative film frames before the negative film frame is developed, the image projected on said last negative frame by said last projection being registered with the image of the new record resulting from said exposing of said last negative frame, except for the part of the record made by a moving element, whereby the record upon succeeding frames indicates the relative movement of elements of the object.

4. The method of photographically recording data, comprising the steps of moving a strip of negative film along a predetermined pathway, exposing successive frames of said film to form thereon a latent image of an object as each frame reaches a predetermined position along said pathway, flowing a developer solution over the emulsion side of each frame as it reaches a subsequent position along said pathway to develop the latent image thereon, moving a strip of positive film in timed relation to the movement of the negative film in a pathway adjacent the pathway thereof, projecting light through the successive frames of developed negative film to print the developed image upon correlated positive film frames while each negative film frame is in the position wherein it was developed, flowing a developer solution over each positive film frame to develop the image thereon before it is moved from the position in which it was exposed, and projecting light successively through each of the developed positive film frames to impinge upon one of said negative film frames before the negative film frame reaches the position wherein it is developed, the image projected on said last negative frame by said last projection being registered with the image of the new record resulting from said exposing of said last negative frame, except for the part of the record made by a moving element, whereby the record upon succeeding frames indicates the relative movement of elements of the object.

5. The method of photographically recording data from a radar screen, comprising the steps of moving a strip of negative film along a predetermined pathway adjacent said screen, exposing successive frames of said film to form thereon a latent image of the traces upon said screen as each frame reaches a predetermined position along said pathway, flowing a developer solution over the emulsion side of each frame as it reaches a subsequent position along said pathway to develop the latent image thereon, moving a strip of positive film in timed relation to the movement of the negative film in a pathway adjacent the pathway thereof while the exposed frames are unfixed, projecting light through successive negative frames to print the developed image upon the correlated positive film frames while each negative film frame is in the position wherein it was developed, flowing a developer solution over each positive film frame to develop the image thereon before it is moved from the position in which it was printed, and projecting light successively through each of the developed positive film frames to impinge upon one of said negative film frames before the negative film frame reaches the position wherein it is developed, the image projected on said last negative frame by said last projection being registered with the image of the new record resulting from said exposing of said last negative frame, except for the part of the record made by a moving element, whereby the record upon succeeding frames indicates the relative movement of traces on the screen.

6. The method according to claim 5 characterized by the rapid movement of the frames of the positive film strip after the developing of a series thereof and the successive projection of the images thereon to form a time-accelerated motion picture thereby clearly to indicate the movement of the traces on the screen.

7. Apparatus for photographically recording data, comprising means for conjointly moving strips of negative and positive film along adjacent pathways, means for exposing the negative film strip to form photographically a succession of latent images of an object thereon at a selected point along the pathway thereof, processing means for sequentially developing said images, printing means including a light source for sequentially printing the developed images upon the positive film strip, further processing means for sequentially developing the latent images printed upon the positive film strip, and projecting means including a light source for projecting light rays through successive developed images of positive film strip to impinge upon the undeveloped negative film strip, the image thus projected on the undeveloped negative strip by said projecting means being registered with the latent image resulting from said exposing of said negative strip, except for the part of the record made by a moving element, whereby the record upon succeeding frames indicates the relative movement of elements of the object.

8. Apparatus for photographically recording data, comprising means for conjointly moving strips of negative and positive film along adjacent pathways, means for exposing successive frames of the negative film strip to form photographically a latent image of an object thereon as each frame reaches a predetermined position along the pathway of said negative film, processing means for sequentially developing said frames, printing means including a light source for sequentially printing the developed image of each negative frame upon a corresponding positive frame, further processing means for sequentially developing the latent images printed upon the positive frames, and projecting means including a light source for projecting light rays through successive positive frames to impinge upon respective undeveloped negative frames, the image thus projected on the undeveloped negative strip by said projecting means being registered with the latent image resulting from said exposing of said negative strip, except for the part of the record made by a moving element, whereby the record upon succeeding frames indicates the relative movement of elements of the object.

9. Apparatus for photographically recording data, comprising feeding means for intermittently moving a strip of negative film along a predetermined pathway, an exposure station located adjacent said pathway, a developing station for said negative film located along said pathway beyond the exposure station, reckoned in the direction of film movement, feeding means for intermittently moving a strip of positive film in a pathway adjacent said first pathway and in timed relation to the negative film, means including a light source and optical members for projecting light from said source successively through each of the developed negative frames to impinge and print upon the correlated frames of said positive film, a processing station along the second pathway for successively developing said positive film frames subsequent to the printing thereof, and a projecting station including a second light source and optical members for directing light from the source successively through each of the developed positive film frames to impinge upon a correlated negative film frame at said exposure station, the image thus projected on said correlated negative frame by said projecting station being registered with the latent image projected on said last negative frame by said exposure station, except for the part of the record made by a moving element, whereby the record upon succeeding frames indicates the relative movement of elements of the object.

10. Apparatus according to claim 9, comprising also beam splitting means and an optical system including a viewing screen, said beam splitting means being located to divert and direct upon said screen a portion of the light from the second light source passing through the processed positive film frames.

References Cited in the file of this patent

UNITED STATES PATENTS

| | | |
|---|---|---|
| 1,682,931 | Pifer | Sept. 4, 1928 |
| 2,586,772 | Ashby | Feb. 26, 1952 |